(12) United States Patent
Schmidt et al.

(10) Patent No.: US 11,245,124 B2
(45) Date of Patent: Feb. 8, 2022

(54) DIAGNOSTIC SYSTEM, FUEL CELL SYSTEM HAVING A DIAGNOSTIC SYSTEM, AND METHOD FOR DETERMINING CATHODE GAS CONTAMINATION

(71) Applicants: AUDI AG, Ingolstadt (DE); Volkswagen AG, Wolfsburg (DE)

(72) Inventors: Lasse Schmidt, Wolfsburg (DE); Sebastian Kirsch, Sassenburg (DE); Gerold Hübner, Braunschweig (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 347 days.

(21) Appl. No.: 16/193,149

(22) Filed: Nov. 16, 2018

(65) Prior Publication Data
US 2019/0157693 A1    May 23, 2019

(30) Foreign Application Priority Data
Nov. 17, 2017 (DE) ..................... 10 2017 220 562.8

(51) Int. Cl.
*H01M 8/0444* (2016.01)
*H01M 8/04537* (2016.01)
(Continued)

(52) U.S. Cl.
CPC ... *H01M 8/04455* (2013.01); *H01M 8/04544* (2013.01); *H01M 8/04574* (2013.01);
(Continued)

(58) Field of Classification Search
None
See application file for complete search history.

(56) References Cited

U.S. PATENT DOCUMENTS

| | | | |
|---|---|---|---|
| 2006/0190204 A1 | 8/2006 | McHardy et al. | |
| 2010/0248055 A1* | 9/2010 | Imanishi | H01M 8/04552 429/432 |

(Continued)

FOREIGN PATENT DOCUMENTS

| | | |
|---|---|---|
| DE | 103 92 589 T5 | 5/2005 |
| DE | 10 2014 224 611 A1 | 11/2015 |

(Continued)

OTHER PUBLICATIONS

DE 102013218079 English translation. Schulze et al. Germany. Mar. 10, 2016 (Year: 2016).*

(Continued)

*Primary Examiner* — Christopher P Domone
(74) *Attorney, Agent, or Firm* — Seed Intellectual Property Law Group LLP

(57) ABSTRACT

A diagnostic system for determining the cathode gas quality of a fuel cell system has a fuel cell stack, with a diagnostic fuel cell which can be connected at the cathode side to a cathode supply line and at the anode side to an anode supply line of the fuel cell system. The diagnostic system furthermore comprises a detection unit which is configured to detect a measured value or the measured value time curve of the diagnostic fuel cell operating with the cathode gas provided via the cathode supply line and with the anode gas provided via the anode supply line. The present disclosure moreover relates to a fuel cell system having a diagnostic system, and to a corresponding method.

13 Claims, 5 Drawing Sheets

(51) Int. Cl.
 H01M 8/04664 (2016.01)
 H01M 8/04701 (2016.01)
 H01M 8/04828 (2016.01)
(52) U.S. Cl.
 CPC ... *H01M 8/04671* (2013.01); *H01M 8/04679* (2013.01); *H01M 8/04701* (2013.01); *H01M 8/04828* (2013.01)

(56) References Cited

U.S. PATENT DOCUMENTS

2010/0255385 A1* 10/2010 Wolf .................. H01M 8/0444
 429/403
2017/0331128 A1* 11/2017 Schwarz ........... H01M 8/04223

FOREIGN PATENT DOCUMENTS

| DE | 10 2014 218 079 A1 | | 3/2016 |
|----|---|---|---|
| JP | 2005332702 | * | 12/2005 |
| JP | 2013-171701 A | | 9/2013 |
| JP | 2013-258043 A | | 12/2013 |

OTHER PUBLICATIONS

JP 2005332702 English translation. Kanbera. Japan. Dec. 2, 2005 (Year: 2005).*

* cited by examiner

DIAGNOSTIC SYSTEM, FUEL CELL SYSTEM HAVING A DIAGNOSTIC SYSTEM, AND METHOD FOR DETERMINING CATHODE GAS CONTAMINATION

BACKGROUND

Technical Field

The present disclosure relates to a diagnostic system for determining the cathode gas quality of a fuel cell system having a fuel cell stack, to a fuel cell system, and to a method for determining a cathode gas contamination in a fuel cell system.

Description of the Related Art

Fuel cells exhibit a loss of performance if cathode gas pollutants, i.e., in particular air pollutants, reach the catalyst. The problem here is that the cathode gas quality is not always known and varies over both space and time. At the same time, a loss of performance of the fuel cell may also be ascribed to other factors, i.e., cathode gas contamination is not always a cause of loss of performance. In the event of a misdiagnosis, restoration operations are unnecessarily performed on the fuel cell. However, these may damage the membrane electrode assembly (MEA). In addition, the filters and catalysts of the fuel cell must be designed larger in order to compensate for a loss of performance.

DE 10 2014 224 611 A describes a method and a device for adjusting the oxygen partial pressure of a fuel cell system. The fuel cell system has a contamination sensor measuring the pollution load of the intake air. This is done by measuring the flow rate and the oxygen concentration in the air. In such systems, air pollution can be detected only at one location in the fuel cell system, and neither the influence of the air contamination on the fuel cells nor the air contamination itself can be examined in greater detail.

BRIEF SUMMARY

Therefore, the present disclosure provides a diagnostic system, a fuel cell system, and a method for determining a cathode gas contamination in a fuel cell system that allow an improved conclusion of the influence of cathode gas quality on the fuel cells.

Some implementations include a diagnostic system designed to determine the cathode gas quality of a fuel cell system having a fuel cell stack. It comprises a diagnostic fuel cell which can be connected on the cathode side to a cathode supply line and on the anode side to an anode supply line of the fuel cell system. Moreover, a detection unit is provided which is configured to detect a measured value or the measured value time curve of the diagnostic fuel cell operated with the cathode gas provided via the cathode supply line and with the anode gas provided via the anode supply line.

Via the diagnostic system according to the present disclosure, the influence of a decrease in the cathode gas quality for the fuel cell system may be examined by way of example by means of a diagnostic fuel cell. The findings thereby collected can be applied directly to the fuel cell stack. A disassembly and reinstallation of the fuel cell stack for examination is dispensed with.

In some implementations, the diagnostic fuel cell has the same structure as the fuel cells of the fuel cell stack. The individual layers of the diagnostic fuel cell are preferably also formed from the same material as the respective layers of the fuel cells of the fuel cell stack. This allows a better conclusion of the influence of the cathode gas contamination on the fuel cell stack via the diagnostic fuel cell.

The cathode gas is preferably oxygen or a mixture with oxygen (for example air), whereas the anode gas is preferably hydrogen or a hydrogen mixture.

In some implementations, a comparator unit is provided which is designed to detect a deviation between the measured value or the measured value curve that are detected by the detection unit and a nominal value that is stored in a memory, or a nominal value curve stored in the memory. With the aid of the comparator unit—i.e., even without a workshop visit—the cathode gas quality may be determined directly, and countermeasures may be initiated promptly in order to improve the cathode gas quality.

To detect the measured value or the detected measured value curve, in some implementations the detecting unit comprises a voltmeter and/or a current meter, and if the detected measured value or the detected measured value curve is a voltage or a voltage curve generated in the diagnostic fuel cell, and/or a current or a current curve generated in the diagnostic fuel cell. The present disclosure thereby utilizes the effect that a performance loss accompanying the decrease in the cathode gas quality leads to a reduction of the current or voltage generated by the diagnostic fuel cell.

In order to be able to also examine the cathode gas quality analytically, it is preferred that a voltage source is provided for impressing a periodically rising and falling voltage on an electrode of the diagnostic fuel cell. In a particularly preferred embodiment, the voltage source is thereby designed to impress a delta voltage on the electrode. In this way, it is possible to carry out cyclovoltametric measurements on one of the electrodes, in particular on the cathode. As a result, the cathode gas, i.e., the air, may be analytically examined in order to be able to determine the substance of the contamination itself. For example, it is possible in this way to draw a conclusion about a contamination of the cathode gas with sulfur dioxide (SO2).

Some implementations include a fuel cell system with a fuel cell stack, and with a diagnostic system connected with a cathode supply line and an anode supply line. Via the diagnostic system, a possible influence of a cathode gas contamination on the entire fuel cell stack may be concluded by means of a diagnostic fuel cell. Necessary countermeasures may be initiated immediately in order to counteract performance loss and damage to the MEA. This also allows the filters and catalysts of the MEA to be of more compact or smaller design.

In some implementations, the diagnostic system is connected in series or parallel to the fuel cell stack. In a serial arrangement, precisely those anode and cathode gases by which the fuel cell stack is also charged flow through the diagnostic fuel cell. In a parallel arrangement, the diagnostic fuel cell is substantially traversed by the same gases as the fuel cell stack, but without affecting the volumetric flow rate through the fuel cell stack.

In some implementations, the following steps are carried out to determine a cathode gas contamination in a fuel cell system:

a. connecting a diagnostic system having a diagnostic fuel cell with a cathode supply line and an anode supply line of the fuel cell system;

b. operating the diagnostic fuel cell of the diagnostic system with the cathode gas provided via the cathode supply line and with the anode gas provided via the anode supply line;

c. detecting a measured value or a measured value time curve of the diagnostic fuel cell by means of a detection unit;

d. comparing the detected measured value or the detected measured value time curve with a predefined nominal value or a predefined nominal value curve; and e. outputting a deviation value or a deviation signal as a function of a deviation determined between the detected measured value or the detected measured value curve and the nominal value or the nominal value curve.

The connecting of the diagnostic fuel cell with the anode supply line and the cathode supply line may already take place in the manufacturing of the fuel cell system.

In an alternative embodiment, the diagnostic system is formed as an external device connected via valves or actuators to the anode supply lines and cathode supply lines, for example during a workshop visit.

In a further alternative embodiment, it is possible that the diagnostic fuel cell is durably connected with anode supply line and the cathode supply line, and that the anode supply line and the cathode supply line each have an actuator for connection to the diagnostic system. This means that the diagnostic system can be activated and deactivated as necessary in order to perform a test of the cathode gas quality.

By operating the diagnostic fuel cell with the cathode gas of the fuel cell system, a conclusion may be made about the cathode gas quality or the cathode gas contamination in the vicinity of the fuel cell stack.

In a preferred embodiment, a measured value time curve of the diagnostic fuel cell is determined, wherein in a more cost-effective embodiment it would be sufficient to determine a single measured value.

The nominal value or also the nominal value curve are thereby stored in a memory of the detection unit. In a preferred embodiment, if the measured value or the measured value curve deviate from the nominal value or the nominal value curve, an audible or a visual deviation signal is output (e.g., by illuminating a warning light).

In an alternative embodiment, the measured value or the detected measured value curve is stored in a memory to be queried at a later point in time, for example during a workshop visit.

For analytical examination of the cathode gas, the method in particular includes the following step:

impressing a voltage on an electrode of the diagnostic fuel cell; and detecting a response current as a function of the impressed voltage by means of the detection unit.

In some implementations, a periodically rising and falling voltage is impressed on the electrode, in particular the cathode, of the diagnostic fuel cell. In a particularly preferred embodiment, a delta voltage is impressed on the electrode of the diagnostic fuel cell. A cyclovoltametric measurement can thereby be carried out at the electrode, in particular at the cathode. This makes it possible to detect sulfur dioxide ($SO_2$) in the cathode gas, for example.

In an alternative embodiment, analytical measurements of the cathode gas may also be carried out on the basis of impedance measurements.

In a particularly preferred embodiment, it is provided that measures to reduce the cathode gas contamination are initiated in the fuel cell system upon output of the deviation value or of the deviation signal.

In this context, it is possible that the temperature in at least one fuel cell stack of the fuel cell system is increased upon output of the deviation value or the deviation signal. This is preferably done in that the comparator unit relays a signal to a controller of the fuel cell system, and the controller increases the temperature as a function of the measured pollutant content. The pollutants can be purged from the cathode gas by increasing the temperature.

As an alternative or in addition, it has proven useful if the humidity of the cathode gas in the fuel cell system is increased upon outputting the deviation value or the deviation signal. The moisture content of the cathode gas is thereby preferably also regulated via the controller of the fuel cell system as a function of the contamination.

A wireless or wired connection between the comparator unit and the controller is preferably provided for regulating the moisture content and/or the temperature in the fuel cell stack and/or in the cathode gas.

BRIEF DESCRIPTION OF THE SEVERAL VIEWS OF THE DRAWINGS

The present disclosure is explained by way of example in exemplary embodiments illustrated in figures, showing.

DETAILED DESCRIPTION

Figure 1:
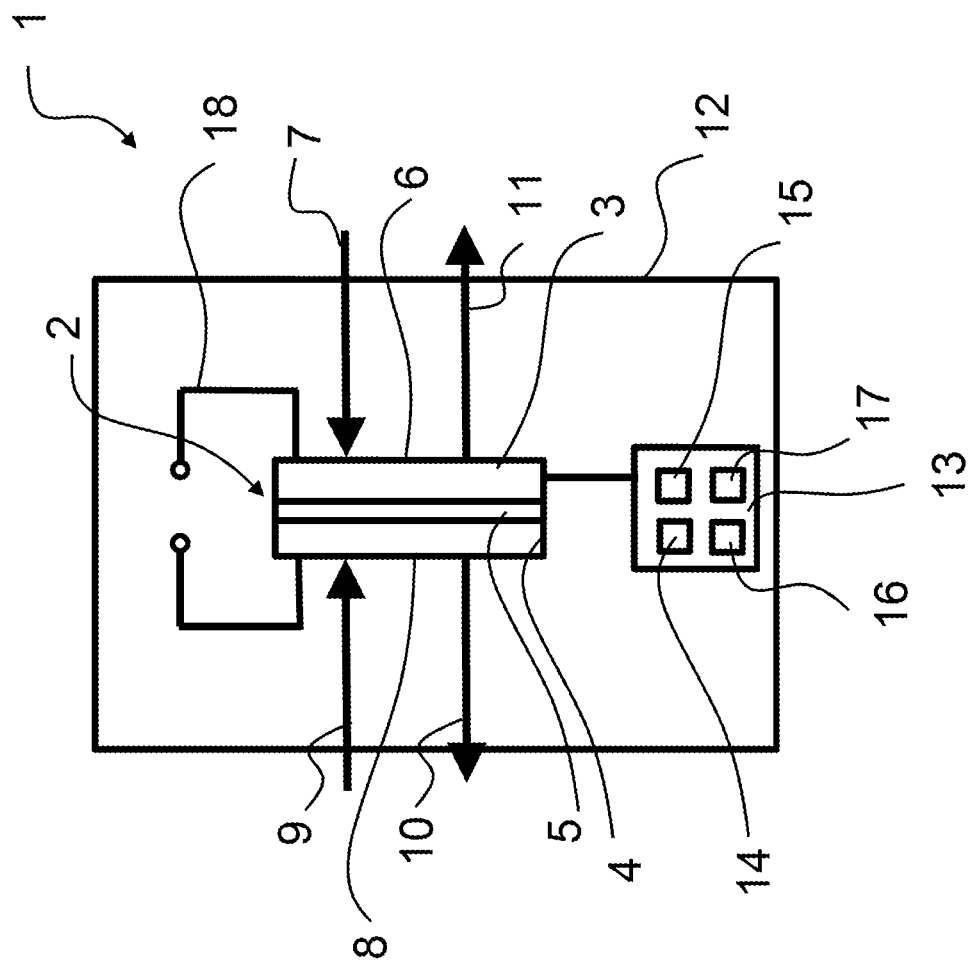
FIG. 1 is a schematic view of the diagnostic system according to the present disclosure.

FIG. 1 shows the diagnostic system 1 according to the present disclosure for determining the cathode gas quality, in particular the air quality. The diagnostic system 1 has a diagnostic fuel cell 2 with a diagnostic cathode 3, a diagnostic anode 4, and a diagnostic membrane 5. On the cathode side 6 or cathode compartment inlet, the diagnostic fuel cell 2 is connected to a cathode supply line 7 for providing cathode gas (air in the present exemplary embodiment). On the anode side 8 or anode compartment inlet, the diagnostic fuel cell 2 is connected with an anode supply line 9 for supplying the anode gas (hydrogen in this exemplary embodiment). Moreover, the diagnostic fuel cell 2 has an anode exhaust line 10 and a cathode exhaust line 11.

The diagnostic system 1 is preferably arranged in a housing 12. Furthermore, the diagnostic fuel cell 2 is connected by wire to a control and evaluation unit 13. The control and evaluation unit 13 comprises a detection unit 14. This is configured to detect a measured value or measured value curve of the diagnostic fuel cell 2, which is operated with the cathode gas provided via the cathode supply line 7 and with the anode gas provided via the anode supply line 9.

In the present exemplary embodiment, the detection unit 14 comprises a voltmeter so that the detected measured value or the detected measured value curve is a voltage generated in the diagnostic fuel cell 2, or a voltage curve generated in the diagnostic fuel cell 2. In an alternative embodiment, the detection unit 14 is formed as a current meter for detecting a current or a current curve. In a further alternative embodiment, it is also possible for the detection unit to comprise a voltage meter and a current meter.

In addition, the control and evaluation unit 13 has a comparator unit 15 which is configured to detect a deviation between the measured value detected by the detection unit 14 or the detected measured value curve and a nominal value stored in a memory 16 or a nominal value curve stored in a memory 16. In addition, the measured values or the measured value curves can be stored in the memory 16 in order to be able to access them at a later point in time.

Further, associated with the control and evaluation unit 13 is a transmitter 17 for wireless or wired transmission of the measured value and the measured value curve to an external controller (not shown in FIG. 1).

For analytical examination of the cathode gas, the diagnostic fuel cell 2 is connected to a voltage source 18, wherein the voltage source 18 is configured such that it impresses on the cathode a periodically rising and falling voltage, preferably a delta voltage.

Figure 2:
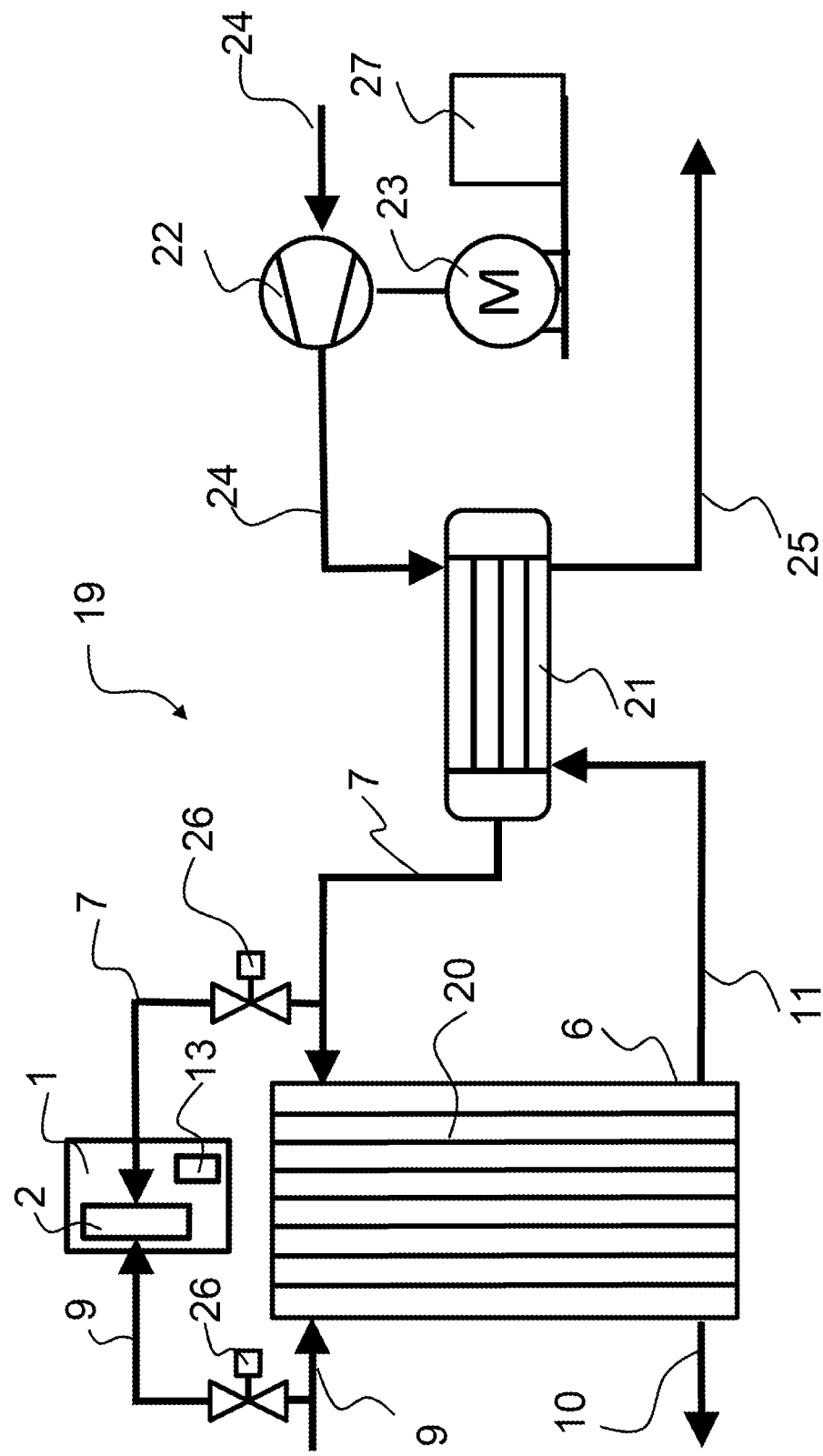
FIG. 2 shows a first embodiment of the fuel cell system according to present disclosure.

FIG. 2 shows a first embodiment of the fuel cell system 19 according to the present disclosure, with a fuel cell stack 20 and with a cathode supply line 7 for supplying the cathode gas, and an anode supply line 9 for supplying the anode gas. Furthermore, the fuel cell system 19 comprises a humidifier 21 and a compressor 22. Via the compressor 22 driven by means of a motor 23 or an engine, the cathode gas is directed via a dry supply line 24 to the humidifier 21. The cathode supply line 7 connects the humidifier 21 to the fuel cell stack 20 and directs humidified cathode gas—e.g., air—to the cathodes of the fuel cell stack 20. In addition, water and unreacted cathode gas is [sic] directed from the fuel cell stack 20 to the humidifier 21 via a cathode exhaust line 11. The humidifier 21 comprises a plurality of water vapor-permeable membranes that extract the moisture from the cathode gas and supply it to the dry cathode gas for humidification. Finally, the humidifier 21 also has a humidifier discharge line 25.

Furthermore, the fuel cell stack 20 is connected on the anode side (8) to an anode supply line 9 for supplying the anode gas, and to an anode exhaust gas line 10 for discharging unreacted anode gas. The use of an anode recirculation is also possible.

In the first embodiment of the fuel cell system 19 according to the present disclosure, the diagnostic system 1 is connected in parallel with the fuel cell stack 20. The cathode supply line 7 is connected to the cathode supply line 7 of the diagnostic system 1 via an actuator 26 formed as a valve. Furthermore, the anode supply line 9 of the fuel cell stack 20 is connected to the anode supply line 9 of the diagnostic system 1 via a further actuator 26 formed as a valve. In the present exemplary embodiment, both the fuel cell stack is 20 and the diagnostic fuel cell 2 are fed by the same cathode gas and the same anode gas.

The diagnostic system 1 may be activated as necessary by means of the actuators 26 of the anode supply line 9 and the cathode supply line 7. Alternatively, if the diagnostic system 1 is not durably connected to the fuel cell stack 20, it may be connected to the fuel cell stack 20 via the actuators 26.

Figure 3:
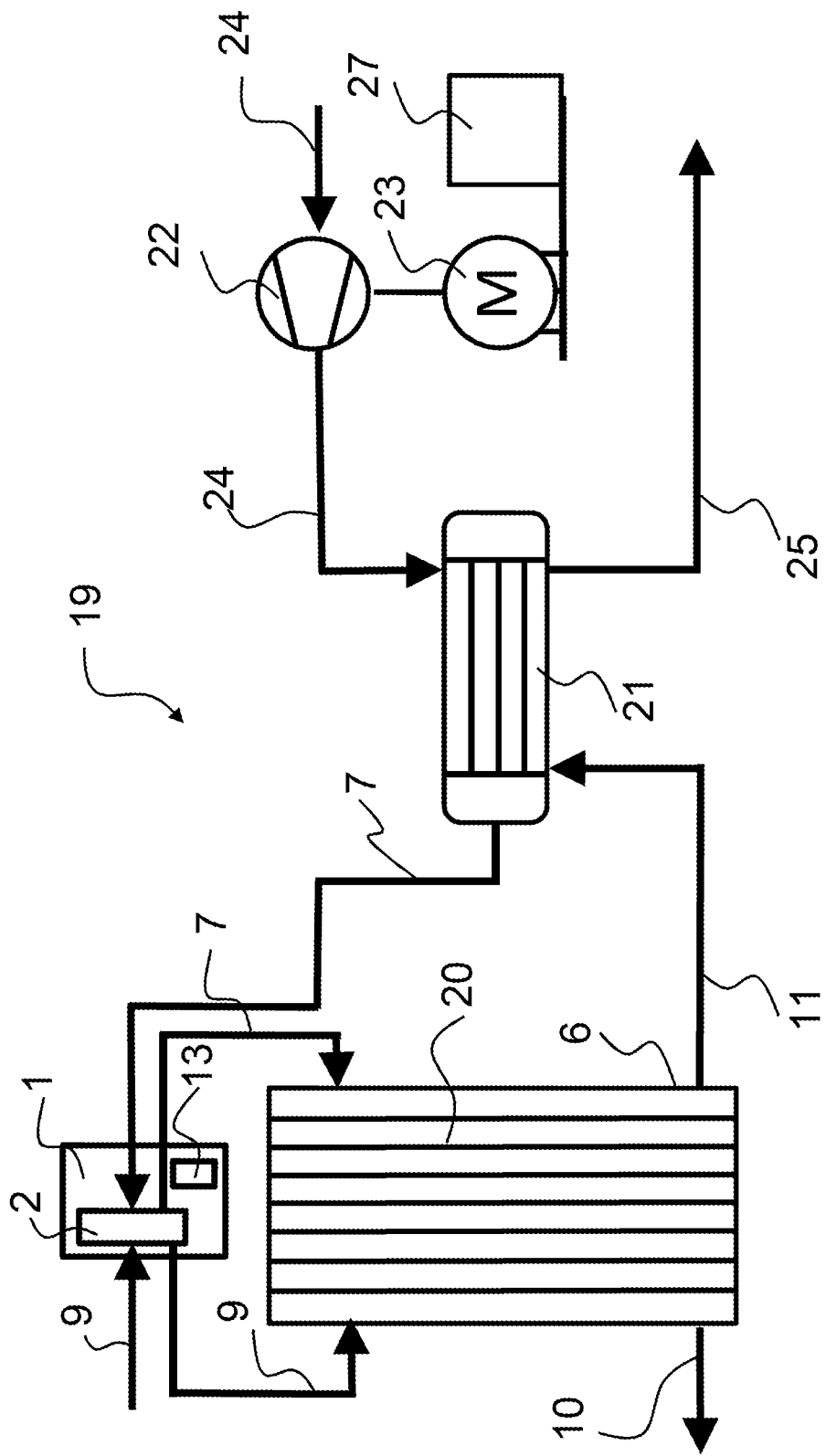
FIG. 3 shows a second embodiment of the fuel cell system according to present disclosure.

FIG. 3 shows a second embodiment of the fuel cell system 1 according to the present disclosure, wherein the diagnostic system 1 is arranged serially with respect to the fuel cell stack 20. The cathode supply line 7 leads from the humidifier 21 to the diagnostic fuel cell 2, and from there to the cathodes of the fuel cell stack 20. The anode supply line 9 leads from a hydrogen tank (not shown) to the diagnostic fuel cell 2, and from there to the anodes of the fuel cell stack 20. In this embodiment, the anode exhaust line 10 and the cathode exhaust line 11 of the diagnostic system 1 are formed as anode supply line 9 and cathode supply line 7 of the fuel cell stack 20. In this embodiment, the fuel cell stack 20 is also supplied with the same anode gas and cathode gas as the diagnostic system 1.

The method according to the present disclosure is executed as follows: First, the diagnostic fuel cell 2 is connected with a cathode supply line 7 and an anode supply line 9 of the fuel cell system 19. As a result, the diagnostic fuel cell 2 is operated with the cathode gas provided via the cathode supply line 7 [and] with the anode gas provided via the anode supply line 9. The detection unit 14 of the control and evaluation unit 13 detects a measured value or a measured value time curve. This may be a voltage, a voltage curve, a current, or a current curve. The measured value or the measured value curve is stored in the memory 16 of the control and evaluation unit 13. The comparator unit 15 compares the detected measured value or the detected measured value curve with a predefined nominal value or a predefined nominal value curve in the memory 16.

Figure 4:
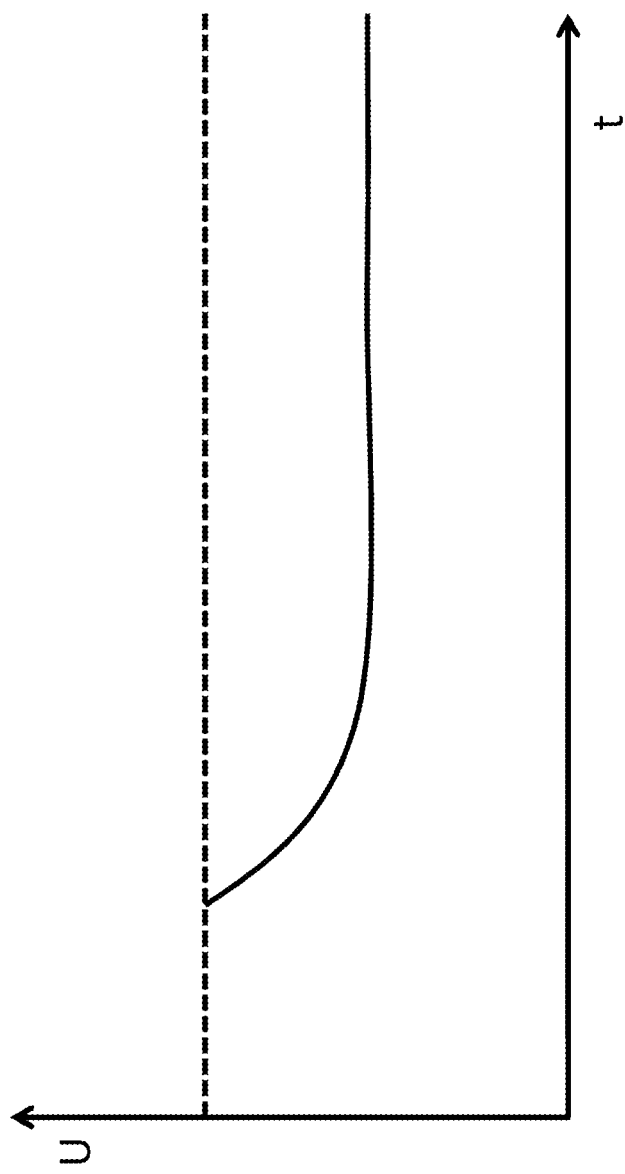
FIG. 4 shows a measurement curve of the diagnostic system.

FIG. 4 shows a typical measurement value curve detected by the detection unit 14. The voltage is plotted as a function of time. The dashed line represents the nominal value curve, whereas the solid line represents the measured value curve. The efficiency of the fuel cell stack, and thus also of the diagnostic fuel cell 2, decreases due to the contamination of the cathode gas. The voltage generated in the diagnostic fuel cell 2 is thus lower than expected. This also applies analogously to a measured current measurement curve.

Given a deviation of the measured value or the measured value curve, determined by the comparator unit 15, from the nominal value or from the nominal value curve, a deviation value or an acoustic or optical deviation signal is output. Alternatively, the deviation of the measured value curve from the nominal value curve may also be determined by the comparator unit 15 if the measured value curve has a slope. The deviation value or the deviation signal may be output either within the fuel cell system 19 or externally, for example at a workshop inspection.

For the analytical examination of the cathode gas, the voltage source 18 impresses a voltage, in particular a delta voltage, on the diagnostic cathode 3. The current meter of the detection unit 14 detects a response current depending on the impressed voltage and stores this in the memory 16. The comparator unit 15 compares the measured value curve with a predetermined nominal value curve stored in the memory 16. Here, too, a deviation signal or deviation value is output in the event of a deviation.

Figure 5A:
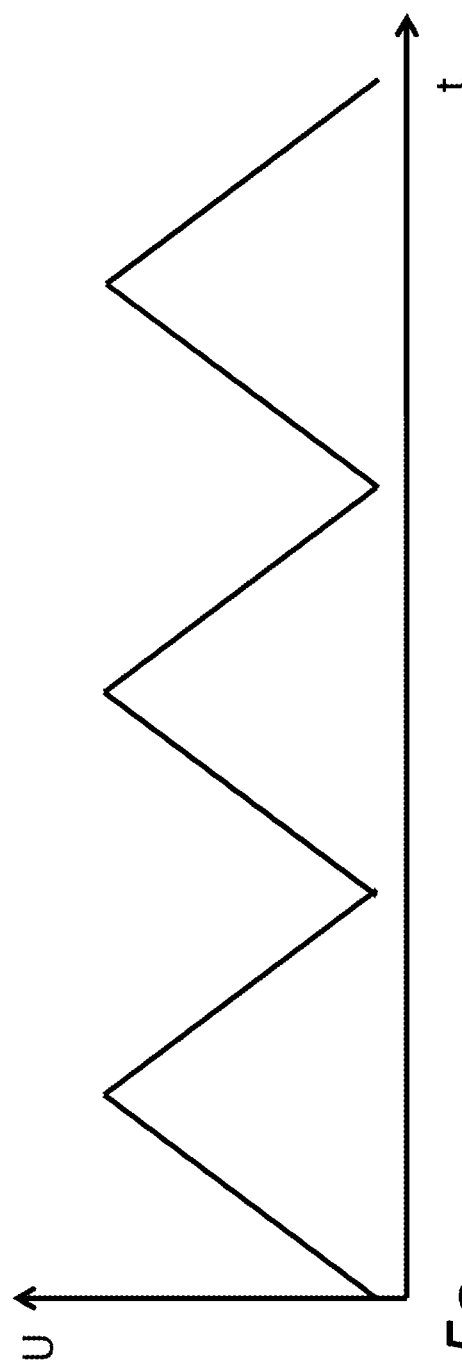
FIG. 5a is a diagram of the delta voltage impressed on the cathode.
Figure 5B:
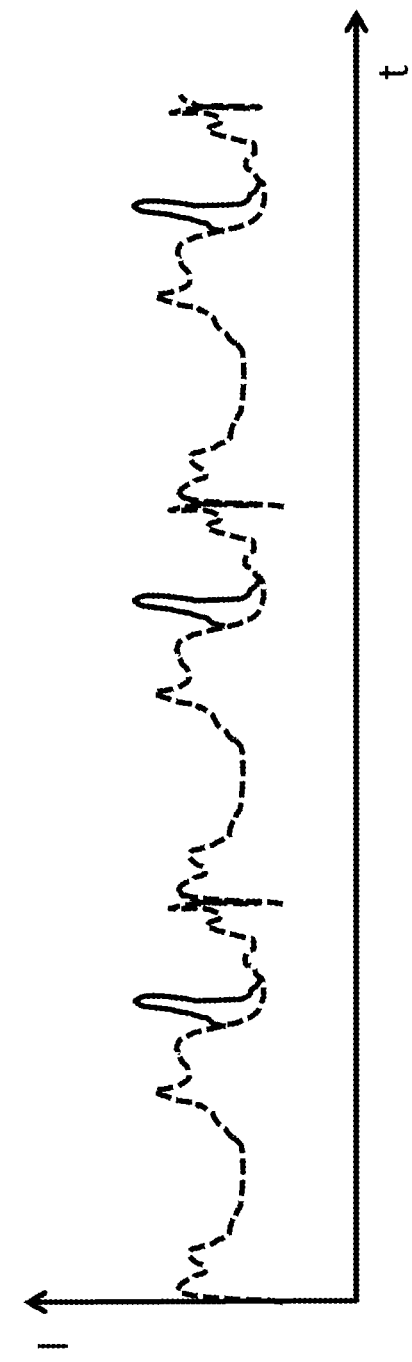
FIG. 5b shows a current response, as a function of time, to the impressed delta voltage.

FIG. 5*a* shows by way of example a delta voltage impressed on the diagnostic electrode. FIG. 5*b* shows a current response as a function of time, wherein the dashed line represents the nominal value curve and the solid line shows the measured value curve. In the present exemplary embodiment, the presence of sulfur dioxide in the cathode gas could be detected by means of the deviation and via this cyclovoltametric measurement.

If a deviation of the measured value/measured value curve from the desired nominal value/nominal value curve has been determined, a signal is transmitted wirelessly to a controller 27 of the fuel cell system 19 by means of the transmitter 17 of the control and evaluation unit 13. The controller 27 then takes measures within the fuel cell system 19 in order to reduce or purge the contamination of the cathode gas. For example, the controller 27 increases the temperature at least in the fuel cell stack 20 of the fuel cell system 19. Alternatively or additionally, the humidity of the cathode gas in the fuel cell system 19 is increased by means of the controller 27. Alternatively or additionally, the controller 27 may also induce the fuel cell system 19 to perform multiple cathode voltage cycles during humid operation.

German patent application no. 102017220562.8, to which this application claims priority, is hereby incorporated herein by reference, in its entirety. The various embodiments described herein can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A diagnostic system for determining a quality of a cathode gas in a fuel cell system having a fuel cell stack, the diagnostic system comprising:
   a diagnostic fuel cell having a cathode side and an anode side, the diagnostic fuel cell connectable on the cathode side with a cathode supply line of the fuel cell system that supplies the cathode gas and on the anode side with an anode supply line of the fuel cell system that supplies an anode gas;
   a detection unit which is configured to detect a measured value or a measured value time curve of the diagnostic fuel cell when in operation with the cathode gas provided via the cathode supply line and with the anode gas provided via the anode supply line; and
   a comparator unit configured to detect a deviation between the measured value detected by the detection unit or the measured time value curve detected by the detection unit and a nominal value stored in a memory or a nominal value time curve stored in the memory and to determine the quality of the cathode gas based on the detected deviation, wherein the comparator unit is further configured to initiate countermeasures to improve the quality of the cathode gas.

2. The diagnostic system according to claim 1, wherein the detection unit comprises a voltmeter and/or a current meter, and the detected measured value or the detected measured value time curve is a voltage or a voltage curve generated in the diagnostic fuel cell and/or a current or a current curve generated in the diagnostic fuel cell.

3. The diagnostic system according to claim 1, further comprising a voltage source for impressing a periodically increasing and decreasing voltage on an electrode of the diagnostic fuel cell.

4. The diagnostic system according to claim 3, wherein the voltage source is designed to impress a delta voltage on the electrode.

5. A fuel cell system comprising:
   a fuel cell stack; and
   a diagnostic system connected to a cathode supply line that supplies a cathode gas and an anode supply line that supplies an anode gas;
   wherein the diagnostic system includes a diagnostic fuel cell having a cathode side and an anode side, the diagnostic fuel cell connectable on the cathode side with the cathode supply line and on the anode side with the anode supply line, a detection unit which is configured to detect a measured value or a measured value time curve of the diagnostic fuel cell when in operation with the cathode gas and the anode gas, and a comparator unit configured to detect a deviation between the measured value detected by the detection unit or the measured value time curve detected by the detection unit and a nominal value stored in a memory or a nominal value time curve stored in the memory and to determine a quality of the cathode gas based on the detected deviation, wherein the comparator unit is further configured to initiate countermeasures to improve the quality of the cathode gas.

6. The fuel cell system according to claim 5, wherein the detection unit comprises a voltmeter and/or a current meter, and the detected measured value or the detected measured value time curve is a voltage or a voltage curve generated in the diagnostic fuel cell and/or a current or a current curve generated in the diagnostic fuel cell.

7. The fuel cell system according to claim 5, further comprising a voltage source for impressing a periodically increasing and decreasing voltage on an electrode of the diagnostic fuel cell.

8. The fuel cell system according to claim 7, wherein the voltage source is designed to impress a delta voltage on the electrode.

9. A method for determining a cathode gas contamination in a fuel cell system, comprising:
   connecting a diagnostic system having a diagnostic fuel cell to a cathode supply line and an anode supply line of the fuel cell system;
   operating the diagnostic fuel cell of the diagnostic system with cathode gas provided by the cathode supply line and with anode gas provided by the anode supply line;
   detecting a measured value or a measured value time curve of the diagnostic fuel cell;
   comparing the detected measured value or the detected measure value time curve with a predefined nominal value or a predefined nominal value time curve;
   outputting a deviation value or a deviation signal as a function of a deviation determined between the detected measured value or the detected measured value time curve and the nominal value or the nominal value time curve; and
   determining the cathode gas contamination based on the determined deviation, wherein countermeasures are initiated to reduce the cathode gas contamination based on the deviation value or the deviation signal.

10. The method according to claim 9, further comprising:
    impressing a voltage on an electrode of the diagnostic fuel cell; and
    detecting a response current as a function of the impressed voltage.

11. The method according to claim 9, wherein a delta voltage is impressed on the electrode of the diagnostic fuel cell.

12. The method according to claim 9, wherein a temperature is increased in a fuel cell stack of the fuel cell system based on the deviation value or the deviation signal.

13. The method according to claim 9, wherein a humidity of the cathode gas in the fuel cell system is increased based on the deviation value or the deviation signal.

* * * * *

UNITED STATES PATENT AND TRADEMARK OFFICE
CERTIFICATE OF CORRECTION

| | |
|---|---|
| PATENT NO. | : 11,245,124 B2 |
| APPLICATION NO. | : 16/193149 |
| DATED | : February 8, 2022 |
| INVENTOR(S) | : Schmidt et al. |

It is certified that error appears in the above-identified patent and that said Letters Patent is hereby corrected as shown below:

In the Claims

<u>Column 8, Claim 9, Line 38:</u>
"measure value time"
Should read:
--measured value time--.

Signed and Sealed this
Third Day of December, 2024

*Katherine Kelly Vidal*

Katherine Kelly Vidal
*Director of the United States Patent and Trademark Office*